US006549921B1

United States Patent
Ofek

(10) Patent No.: US 6,549,921 B1
(45) Date of Patent: *Apr. 15, 2003

(54) METHOD AND APPARATUS FOR PERFORMING POINT IN TIME BACKUP OPERATION IN A COMPUTER SYSTEM

(75) Inventor: Yuval Ofek, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/630,105

(22) Filed: Aug. 1, 2000

Related U.S. Application Data

(63) Continuation of application No. 09/224,914, filed on Jan. 4, 1999, now abandoned, which is a continuation of application No. 08/656,036, filed on May 31, 1996, now Pat. No. 5,857,208.

(51) Int. Cl.[7] .............................................. G06F 17/30
(52) U.S. Cl. ............................ 707/204; 707/202; 714/6
(58) Field of Search ......................... 707/10, 204, 202; 714/6; 395/712

(56) References Cited

U.S. PATENT DOCUMENTS

| | | | | | |
|---|---|---|---|---|---|
| 5,404,508 A | * | 4/1995 | Konrad et al. | .............. | 707/202 |
| 5,594,900 A | * | 1/1997 | Cohn et al. | .................. | 707/202 |
| 5,708,812 A | * | 1/1998 | Dyke et al. | .................. | 395/712 |
| 5,720,026 A | * | 2/1998 | Uemura et al. | ................. | 714/6 |
| 5,857,208 A | * | 1/1999 | Ofek | ........................... | 707/204 |
| 5,987,566 A | * | 11/1999 | Vishlitzky et al. | .......... | 711/114 |
| 6,035,412 A | * | 3/2000 | Tamer et al. | ................... | 714/6 |
| 6,092,066 A | * | 7/2000 | Ofek | ........................... | 707/10 |
| 6,101,497 A | * | 8/2000 | Ofek | ........................... | 707/10 |
| 6,199,074 B1 | * | 3/2001 | Kern et al. | .................. | 707/204 |

* cited by examiner

*Primary Examiner*—Charles Rones
(74) *Attorney, Agent, or Firm*—George A. Herbster

(57) ABSTRACT

A data network with a remote data facility for providing redundant data storage and for enabling concurrent point-in-time backup operations. A local data processing system with a data facility stores a data base and processes applications. A second system, physically separated from the first system, includes a data facility that normally mirrors the data in the first system. In a backup mode, the second system is enabled to transfer data from its data facility to a backup facility concurrently with, but independently of, the operation of the first system. On completion of the backup operation, the second system reconnects with and synchronizes with the first system thereby to reestablish the mirroring operation of the second system.

32 Claims, 6 Drawing Sheets

METHOD AND APPARATUS FOR PERFORMING POINT IN TIME BACKUP OPERATION IN A COMPUTER SYSTEM

CROSS REFERENCE TO RELATED APPLICATION

This application is a continuation of my application Ser. No. 09/224,914 filed Jan. 4, 1999 now abandoned, for a METHOD AND APPARATUS FOR PERFORMING POINT IN TIME BACKUP OPERATION IN A COMPUTER SYSTEM which is a continuation of Ser. No. 08/656,036 filed on May 31,1996 now U.S. Pat. No. 5,857,208 issued Jan. 5, 1999.

BACKGROUND OF THE INVENTION

1. Field of the Invention

This invention generally relates to backup systems for computer storage devices and more particularly to a method and apparatus for performing concurrent backups in a computer system with geographically remote redundant computer storage. devices.

2. Description of Related Art

Maintaining the integrity of data in computer storage devices has been and continues to be an important area of computer development. Systems today generally maintain integrity by using redundant storage devices or by using periodic backup procedures that transfer data onto a removable media. Many systems incorporate both redundancy and periodic backup procedures to benefit from the known advantages of each and to minimize the effect of the disadvantages of each.

There are several ways to implement redundancy that have a variety of names. Generally, however, the popular methods are known as RAID (Redundant Array of Independent Disks) methods that are further defined by different levels. These levels extend from a RAID-1 level in which one data storage device mirrors the data in another data storage device to striping in accordance with RAID-0 procedures and to variants of redundant storage of data and parity information in accordance with RAID-3 through RAID-5 procedures. These systems are all characterized by performing the corresponding redundant operation concurrently with the execution of application programs in the main system.

RAID procedures are particularly useful in preventing the loss of data due to hardware failures. When a particular disk storage device fails, the data either resides on or can be reconstructed from data on other disk storage devices. However, if an event occurs, such as major damage caused by fire or the like or if an application program corrupts data, it is not possible to reconstruct the data as it existed prior to the event because redundant systems generally do not save information on an historical basis. Tape backup systems, that now also include optical disks and other media, provide a method of moving data offsite to avoid destruction as by a major physical catastrophe. They also provide an historical record because each backup generally seeks to obtain a snapshot of the entire data storage system at a particular point in time. However, tape backups must be scheduled and are not made continuously.

Combining both redundancy and external backups provides the potential for achieving all the advantages of the individual integrity systems and eliminating many of the disadvantages of both. However, needs of such a system have become more difficult to satisfy in recent years. For example, demands on the use or availability of the data storage devices for applications programs have increased. The size of those data storage devices has increased from capacities measured gigabytes ($10^9$) to terabytes ($10^{12}$). In computer systems with a single data storage facility, data storage devices in the facility or some portion of them are taken out of service during the backup operation. In many systems the time for such backups cannot be tolerated by the applications running on the system. Several systems that have been proposed for providing concurrent backups while avoiding these problems are disclosed in the following United States Letters Patent:

U.S. Pat. No. 5,212,784 (1993) Sparks
U.S. Pat. No. 5,241,668 (1993) Eastridge et al.
U.S. Pat. No. 5,241,670 (1993) Eastridge et al.
U.S. Pat. No. 5,473,776 (1995) Nosaki et al.

U.S. Pat. No. 5,212,784 to Sparks discloses an automated concurrent data backup system in which a Central Processing Unit (CPU) transfers data to and from storage devices through a primary controller. The primary controller connects through first and second independent buses to first and second mirrored storage devices respectively (i.e., a primary, or mirrored device and a secondary or mirroring data storage device). A backup controller and device connect to the secondary storage device through its bus. Normally the primary controller writes data to both the primary and secondary data storage devices. The CPU initiates a backup through the primary controller. In response the primary controller then writes only to the primary data storage device and enables the backup controller to take control of the second bus and transfer data from the secondary data storage device to the backup media. After a backup operation is completed, the primary controller resynchronizes the storage devices by updating any changes that occurred to the primary data storage device while the backup operation was underway. Examples are also disclosed in which the primary controller connects to three and four storage devices that enable the system to operate with redundancy by mirroring two storage devices while the backup occurs with a third storage device.

U.S. Pat. Nos. 5,241,668 and 5,241,670 to Eastridge et al. disclose different aspects of concurrent backup procedures. In both systems a request for a backup copy designates a portion of the stored data called a data set. For example, if the data storage devices contain a plurality of discrete data bases, a data set could include files associated with a corresponding data base. In a normal operation, the application program is suspended to allow the generation of an address concordance for the designated data sets. Execution of the application program then resumes. A resource manager is established to manage all input and output functions between the storage sub-systems and associated memory and temporary memory. The backup copy is formed on a scheduled and opportunistic basis by copying the designated data sets from the storage sub-systems and updating the address concordance in response to the copying. Application updates are processed during formation of the backup copy by buffering the updates, copying the affected uncopied designated data sets to a storage sub-system memory, updating the address concordance in response to the copying, and processing the updates. The designated data sets can also copy to the temporary storage memory if the number of designated data sets exceeds some threshold. The designated sets are also copied to an alternate memory from the storage sub-system, storage sub-system memory and temporary host memory utilizing the resource manager and the altered address concordance to create a specified order backup copy of the designated data sub-sets from the copied portions of the designated sub-sets without user intervention.

If an abnormal event occurs requiring termination of the backup, a status indication is entered into activity tables associated with the plurality of storage sub-systems and devices in response to the initiation of the backup session. If an external condition exists that requires the backup to be interrupted, the backup copy session terminates and indications within the activity tables are reviewed to determine the status of the backup if a reset notification is raised by a storage sub-system. This enables the track extents which are active for a volume associated with a particular session to be determined. A comparison is then made between the track events which are active and volume and track extents information associated with a physical session identification. If a match exists between the track extents which are active and the volume of and track extent information associated with a physical session identification, the backup session resumes. If the match does not exist, the backup terminates.

U.S. Pat. No. 5,473,776 to Nosaki et al. discloses a concurrent backup operation in a computer system having a central processing unit and a multiple memory constituted by a plurality of memory devices for on-line storing data processed by tasks of the central processing unit.

A data backup memory is provided for saving data of the multiple memory. The central processing unit performs parallel processing of user tasks and a maintenance task. The user tasks include those that write currently processed data into the multiple memory. The maintenance task stops any updating of memory devices as a part of the multiple memory and saves the data to a data backup memory.

Each of the foregoing references discloses an approach for performing backup operations concurrently with the execution of applications programs in a computer system. However, in each, the system operates in the environment of a single computer system under common control. For example, in the Sparks patent the CPU connects through a primary controller to the first and second memories and to the backup controller. The Eastridge et al. and the Nosaki et al. patent references disclose systems in which the execution of applications programs is also involved in the backup operation. Further the components required for the backup operation and for maintaining redundancy are all located at a common site in each of the systems.

More recently, redundancy has come to include a concept by which an array of disks at one location (i.e., a local data facility at a local site) are mirrored by a second array of disks at a remote location (i.e., a remote data facility at a remote site). The remote site may be in a common building with the local site or up to hundreds of miles away from the local site. None of the foregoing systems suggest a viable solution for providing data integrity by combining redundancy and physical tape backup in such systems particularly given the apparent dependence of each of those systems on operations within the CPU that is performing applications programs.

SUMMARY

Therefore it is an object of this invention to provide a computer system that enables redundant storage at a remote data facility and incorporates a provision for backup into an independent media at that remote data facility.

Another object of this invention is to provide a system adapted to provide backup in a remote data facility that provides a point in time backup without interfering with the operations on a data processing system at a local site.

Still another object of this invention is to provide a method and apparatus for backing up data in a remote data facility that is fully transparent to operations at a local site.

In accordance with one aspect of this invention it is possible to produce a point-in-time backup of data in a data processing system having a host computer and a first data storage facility that stores data at predetermined locations in data blocks, a second data storage facility and a data backup facility. During a normal operating mode the second data storage facility mirrors the first data storage facility in response to a copy program. The copy program is disabled thereby isolating the second data storage facility from the first data storage facility while enabling the first data processing system to continue its operations with the first data storage facility. This allows the backup of the data in the data the second data storage facility onto the backup facility. While the backup is proceeding, a recording takes place at the first data processing system to identify each data block in the first data storage facility that changes as a result of the operation of the data processing system. Upon completion of the backup operation, the copy program is enabled to copy data blocks from the first data storage facility to the second data storage facility corresponding to the recorded identifications thereby reestablishing the second data storage facility as a mirror of the first data storage facility.

In accordance with another aspect of this invention, a point-in-time backup of data in a first disk storage facility associated with a data processing system is achieved by providing a backup facility and a second disk storage facility for operating normally as a mirror for the first disk storage facility. A backup operating mode is established whereby the second disk storage facility is isolated from the first disk storage facility. This enables the data processing system and the first disk storage facility to continue normal operations and to record changes to the data in the first disk storage facility, and enables the operation of the backup facility simultaneously with the operation of the data processing system with its first disk storage system to produce a backup of the data in the second disk storage facility. When the backup operation is complete, any data in the first disk storage facility that was altered during the backup operation is copied to the second disk storage facility whereby the second disk storage facility resumes its operation as a mirror for the first disk storage facility.

In accordance with still another aspect of this invention, data redundancy is provided for a first data storage facility in a data processing system by providing a backup facility using a backup medium and a second data storage facility that operates in.a first mode for producing on the second data storage facility a redundant copy of the data stored in the first storage facility. A second operating mode is enabled thereby isolating the second data storage facility from the first data storage facility, continuing normal operations between the first data storage facility and the data processing system, and transferring data from the isolated second data storage facility to the medium in the backup facility simultaneously with and independently of the operation of the data processing system with the first data storage facility. After completing the backup operation and independently of the data processing system, the first operating mode is reestablished whereby the second data storage facility updates the copy of the data stored therein by transferring data from the first data storage facility changed during the second operating mode.

In accordance with yet another aspect of this invention, backup is provided for data in a first data storage facility in a first data processing system by providing a backup system including a second data storage facility and a backup facility using a backup medium for receiving data from the second data storage facility and a program for effecting a backup operation. A path is established between the first and second data storage facilities to enable the second data storage facility to mirror the first data storage facility. In response to a backup command the backup system interrupts communications over the path between the first and second data storage facilities without disrupting normal operations between the first data storage facility and the data processing system, enables the backup program to transfer data from the isolated second data storage facility to the medium in the backup facility simultaneously with and independently of the operation of the data processing system and, after completion of the backup operation and independently of the data processing system, reestablishes the path between the first and second data storage facilities whereby the second data storage facility is reestablished as a mirror for the first data storage facility.

BRIEF DESCRIPTION OF THE DRAWINGS

It is intended that the appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
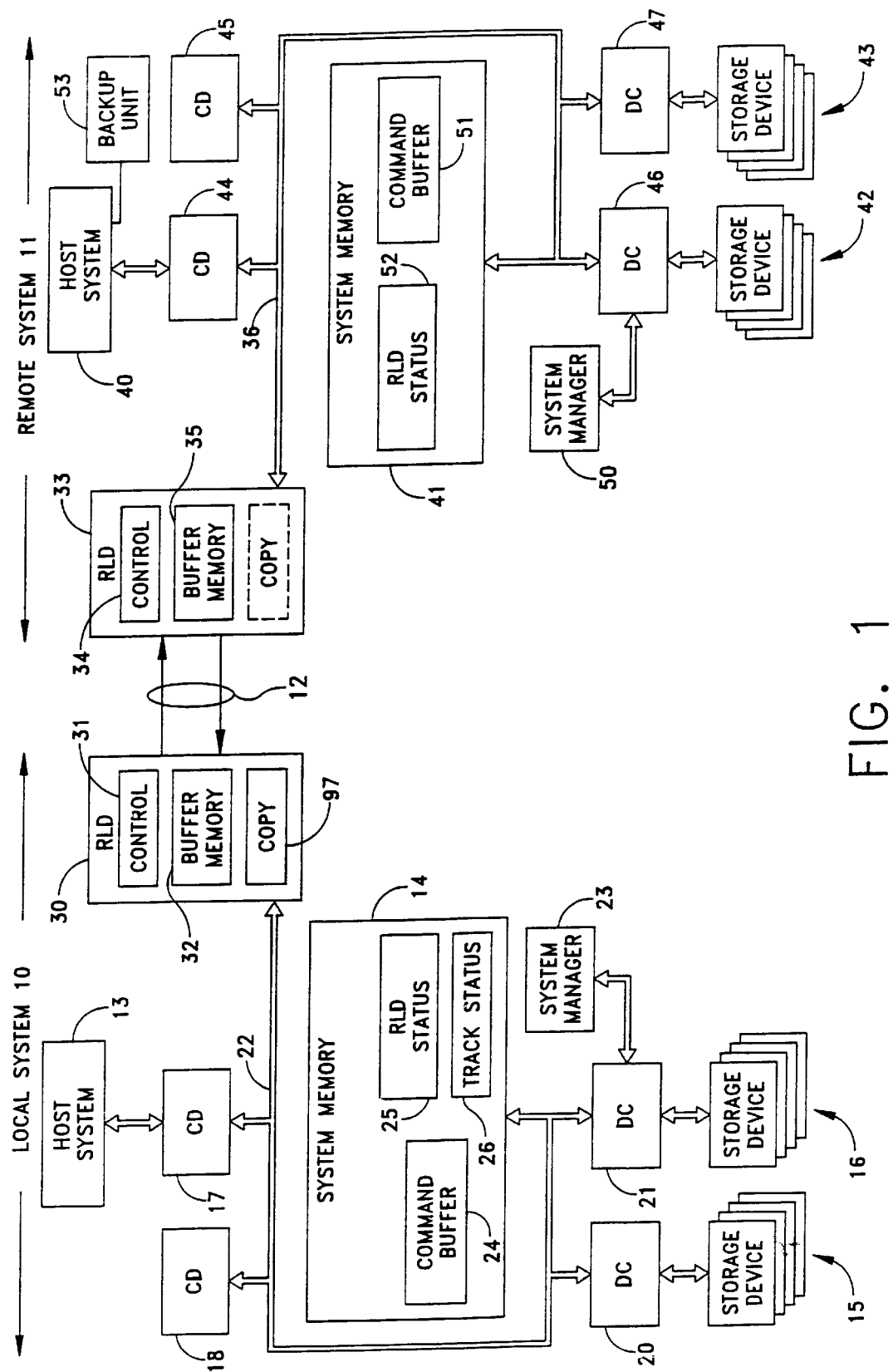
FIG. 1 is a block diagram of (interconnected geographically remote data processing systems for operating in accordance with this invention.

FIG. 1 depicts a data processing network comprising two essentially identical data processing systems that include a local system 10 and a geographically remote system 11. A communications link 12, comprising fiber optic cables or high speed data transmission lines, interconnects the local system 10 and remote system 11. The physical separation between the local system 10 and the remote system 11 can be up to hundreds of kilometers or more.

The local system 10 comprises major components including a host system 13 including a host processor and a first data storage facility that includes a system memory 14 and sets 15 10 and 16 of multiple data storage devices or data stores. The system memory 14 can comprise a buffer or cache memory; the storage devices in the sets 15 and 16 can comprise disk storage devices, optical storage devices and the like. The sets 15 and 16 represent an array of storage devices in any of a variety of known configurations.

A channel director (CD) 17 provides communications between the host system 13 and the system memory 14; device controllers (DC) 20 and 21 provide pathways between the system memory 14 and the storage device sets 15 and 16. A bus 22 interconnects the system memory 14, the channel directors 17 and 18 and the device controllers 20 and 21. A system manager 23 enables an operator to transfer information between the various elements of the system, such as a command buffer 24, RLD STATUS block 25 and a TRACK STATUS block 26 that are described in more detail later through one of the device controllers, namely the device controller 21 in FIG. 1. Bus access logic, not shown but known in the art, controls transfers over the bus.

Generally speaking, the local system 10 operates in response to commands from one or more host systems, such as the host system 13, that a connected channel director, such as channel director 17, receives. The channel directors 17 and 18 transfer commands to a command buffer in the system memory 14. The command buffer 24 stores data structures and write requests that the device controllers generate. The device controllers, such as the device controllers 20 or 21, respond by effecting a corresponding operation using the information in the command buffer 24. The selected device controller then initiates a data operation. Reading operations transfer data from the storage devices to the system memory 14 through a corresponding device controller and subsequently transfer data from the system memory 14 to the corresponding channel director, such as channel director 17 when the host system 13 initiates the data writing operation.

The local system 10 in FIG. 1 additionally includes a remote link director (RLD) 30 for controlling transfers of data between the local system 10 and the remote system 11 over the communication link 12. The major components of the remote link director 30 include a control 31 and a buffer memory 32. The remote link director 30 connects to the system bus 22 and the communications link 12.

The remote system 11 includes a remote link director 33 that connects to the communications link 12 and includes a control 34 and a buffer memory 35. Signals received from the remote link director 33 transfer over a system bus 36, like the system bus 22. The remote system 11, like the local system 10, includes, as its major components, a host system 40, a system memory 41 and storage device sets 42 and 43. The sets 42 and 43 represent an array of storage devices configured to mirror the sets 15 and 16. In the same fashion as in the local system 10, the remote system 11 includes channel directors 44 and 45 for connection to host systems. In this particular embodiment, the host system 40 connects to the bus 36 through the channel director 44. Device controllers 46 and 47 provide pathways between the system bus 36 and the storage device sets or data stores 42 and 43 respectively. A system manager 50 enables an operator to transfer information between the various elements of the system, such as a COMMAND BUFFER 51 and an RLD STATUS block 52 that are described in more detail later. Bus access logic, not shown but known in the art, controls transfers over the bus.

Each of the local and remote systems 10 and 11 may comprise a Symmetrix integrated cached disk array as manufactured and sold by the assignee of this invention according to known operations as described in Yanai et al., U.S. Pat. No. 5,206,939 issued Apr. 27, 1993. Consequently, the following discussion makes only the references to general operation of such systems. For purposes of this invention it is sufficient to understand that the remote system 11 normally acts as a mirror of the local system 10 on a volume-by-volume basis and that the volumes can be physical volumes, although logical volumes are preferred. Given the geographical separation between the local and remote systems 10 and 11, the system in FIG. 1 operates with an extremely high degree of reliability, even in the event of a natural disaster. Normally, the local system 10 is the active system while the remote system 11 acts as a mirror. In such systems transfers from the local system 10 to the remote system 11 normally occur in response to a writing command issued by a local host system such as the host system 13. The details of such a transfer are discussed later.

The host system 40, in such an environment, typically will be limited to performing read operations in order that the remote system 11 exactly mirror the local system 10. Should some catastrophic event prevent any part of the local system 10 from operating, control can be transferred to the remote system 11 through use of the system manager 50 whereby the remote link director 33 effectively disconnects from the local system 10 to enable the host system 40 to read and write data to the storage device sets 42 and 43. Mirroring remote data facilities are also known in the art and Symmetrix remote data facilities supplied by the assignee of this invention provide such remote mirroring capabilities.

Unlike the prior art operation of the local and remote systems like those shown in FIG. 1, a system constructed in accordance with this invention enables the remote system 11 (1) to disconnect from the local system 10, (2) to enable all the data to transfer to a conventional backup unit 53, such as a conventional tape backup unit, (3) to reconnect to the local system 10 and (4) to resynchronize to the local system 10 and 10 remote system 11 automatically.

This operation requires two types of information, namely: the status of the remote link directories 30 and 33 and the status of each track or corresponding data block in storage device sets 42 and 43. The RLD STATUS block 25 records the status of the remote link directory 30. For purposes of this discussion, it is assumed that the RLD STATUS block 25 has one of three values that represent a "DISCONNECT FOR BACKUP" or "BACKUP" status, a "BACKUP RETURN" status and an "ONGOING" or normal operating mode status. The BACKUP status value indicates that an operator at the local system 10 or the remote system 11 has utilized the corresponding one of the system managers 23 and 50 to terminate communications between the local system 10 and the remote system 11 for the purpose of performing a backup. The RETURNING status means that the system manager 23 or 50 has just reestablished the communications. During intervals characterized by the "BACKUP" and "RETURNING" status, the remote system 11 does not mirror the local system 10. The ONGOING status means that the local system 10 and the remote system 11 are operating normally and are synchronized.

Figure 2:
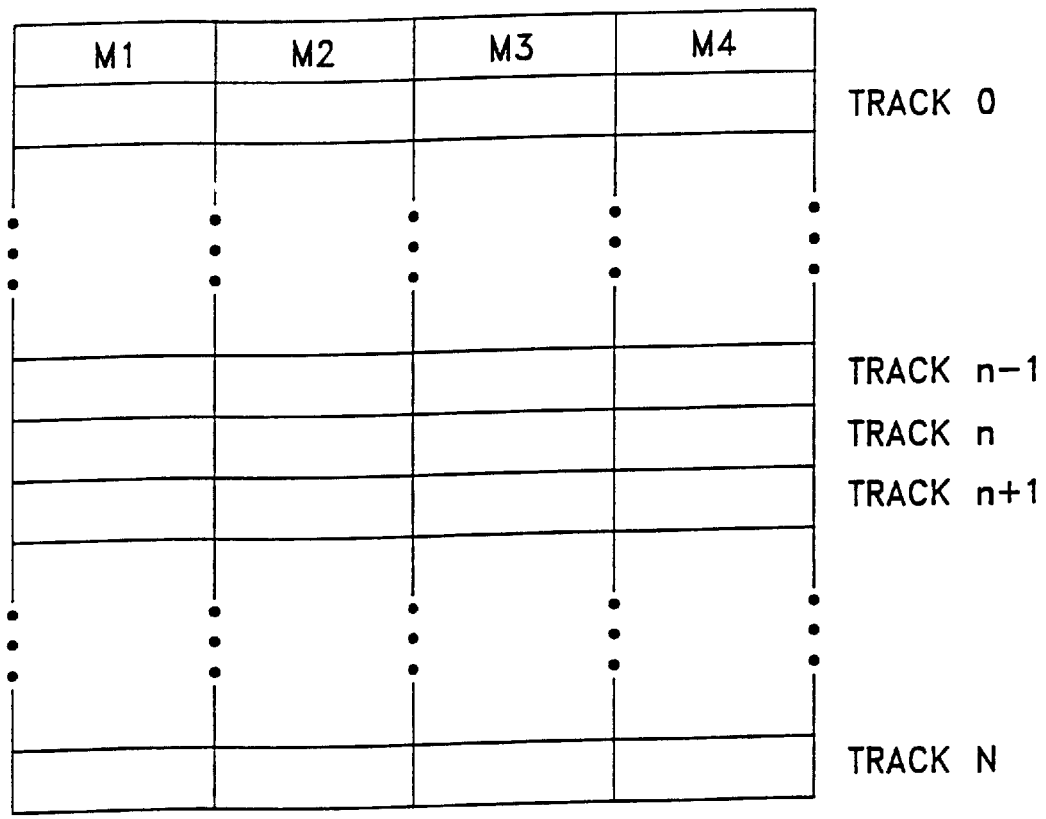
FIG. 2 depicts the details of a TRACK STATUS block that is useful in implementing this invention.

The TRACK STATUS block 26 comprises a bit map with an entry for each track or data block on the storage device sets 15 and 16. FIG. 2 represents the TRACK STATUS block 26 as a matrix in which each row identifies a track in the storage device sets 15 and 16 and in the sets 42 and 43. In FIG. 2 the columns are headed by M1, M2, M3 and M4 that establish a correspondence between the column position and the system containing the TRACK STATUS block in the local system 10 and in each of up to three mirroring systems.

It will be apparent that each entry in the block 26 corresponds to a data block of a minimum transfer size. In Symmetrix systems this is typically a track; however, a given track may be divided into multiple blocks or a block might even comprise multiple contiguous tracks. Such variations only change the track status block 26 by increasing or decreasing the number of rows in the TRACK STATUS block 26, as each row will correspond to one data block.

In the system of FIG. 1, only the data columns identified as the M1 and M2 columns contain relevant TRACK STATUS data as only one local system 10 and one remote system 11 are present. For any given track the M1 column in FIG. 2 indicates whether the data in the corresponding track in the local system 10 is valid while the M2 column indicates whether the data in the corresponding track in the remote system 11 is valid. In an implementation involving two additional remote systems, the M3 and M4 columns in FIG. 2 would indicate the whether the data in the corresponding tracks in the remaining two mirrored systems were valid. Typically and for purposes of this discussion, a "0" indicates a valid data track or block; a "1", an invalid data track or block.

With this as background, it will now be possible to describe the various operations of these components (1) during a normal mirroring mode, (2) during a backup mode and (3) during the return to a normal operating mode.

Normal Mirroring Mode

In a normal operating mode the local system 10 is the active system while the remote system 11 functions solely as a mirror. For example, when the system in FIG. 1 accommodates a database, the local system 10 generally processes applications including those that can effect changes to the data base. For purposes of this description, it is assumed that the host system 13 issues a Channel Control Word (CCW) command including all the necessary parameters from which the system can transfer a data block to or from a particular location in the storage device sets 15 and 16. Other operating systems use other procedures. However, this invention is readily adapted to operate with such systems.

Figure 3:
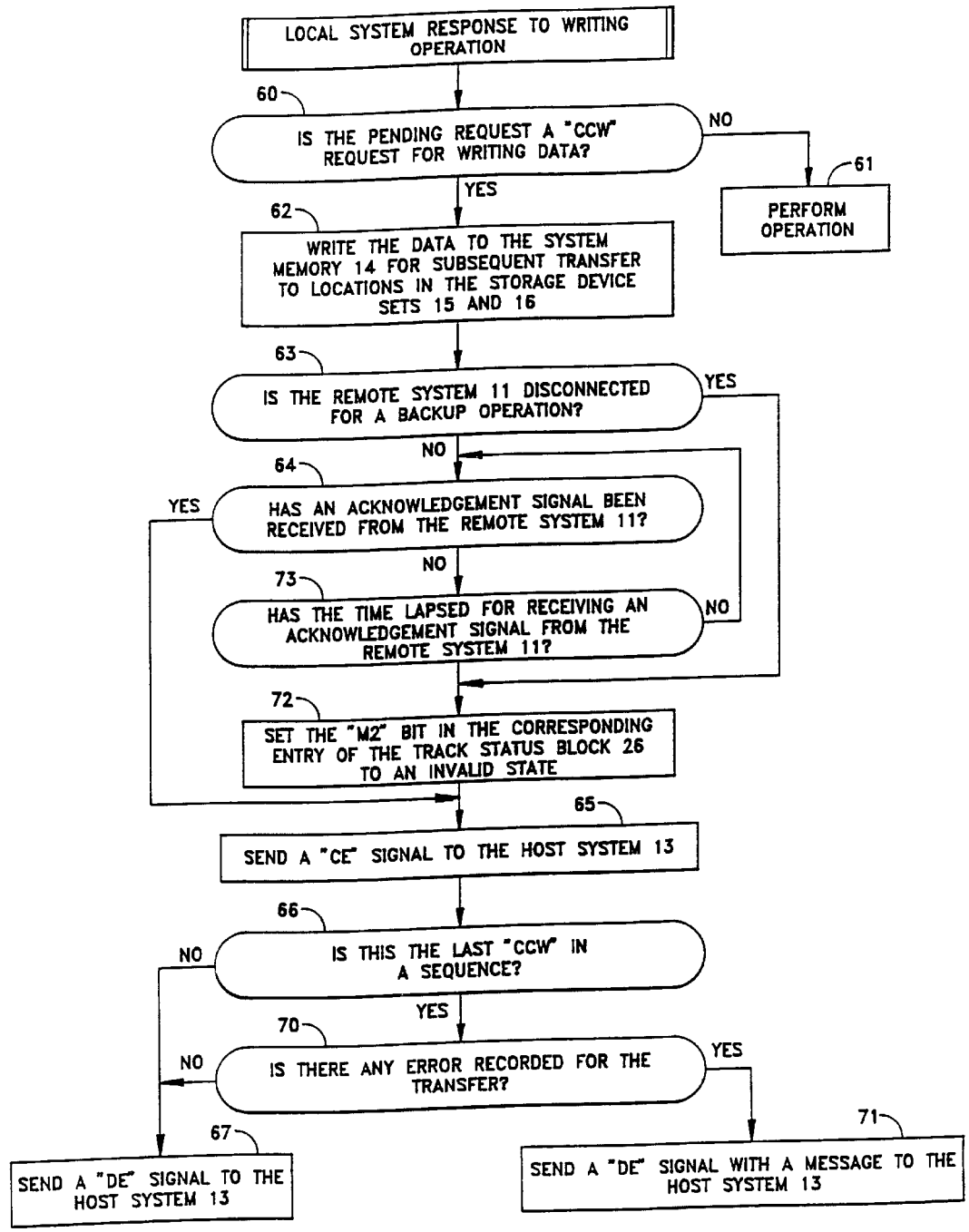
FIG. 3 depicts the process by which a local system as shown in FIG. 1 responds to a writing operation.

When a host system such as the host system 13 in FIG. 1 issues a command, it transfers the CCW command or equivalent to the channel director 17 for transfer to the system memory 14. If the control in the system memory 14 determines that the pending CCW command will perform an operation other than a writing operation for transferring data to a location in one of the storage device sets 15 or 16, the control 24, in step 60 of FIG. 3, diverts to perform the requested operation in step 61. If the CCW request defines a write operation, control transfers from step 60 to step 62 wherein the information is written into the system memory 14 for subsequent transfer to locations in the storage device sets 15 and 16 in a normal fashion.

During normal mirroring operations, the RLD STATUS block 25 indicates an ONGOING status because the remote system 11 connects to the local system 10 through the remote link directors 30 and 33 and the communications link 12 and because the local system 10 and remote system 11 are synchronized. Consequently control transfers from step 63 in FIG. 3 to step 64 where the system awaits an acknowledgement signal that the remote system 11 has received the data being written to its system memory 41. When this acknowledgement is received under predetermined constraints, control transfers to step 65 wherein the control 24 sends a CE, or Channel End, signal to the host system 13 in step 65. If this is the first or an intermediate CCW command in a sequence, step 66 transfers control to step 67 to send a DE, or Device End, signal to the host system 13. After processing the last CCW command in a sequence step 66 diverts to step 70 to test for any error conditions. If no error has occurred, step 67 sends the DE signal to the host system 13. If an error occurred, control passes to step 71, and the control 24 transfers the DE signal with a message identifying the nature of the error.

Consequently during the normal operating mode any changes the host system 13 makes to the data in the storage device sets 15 and 16 automatically produce corresponding changes in the storage device sets 42 and 43. In normal operation the storage device sets 42 and 43 or logical volumes therein exactly mirror the corresponding ones of the storage device sets 15 and 16 or logical volumes therein according to configuration information from the system manager 23 and system manager 50. Although the host system 40 is enabled to access data in the storage device sets 42 and 43 in this mode, it can not alter data. It can access data only on a read-only basis. In the normal operating mode and in the context of a data base system, the local system 10 processes on-line transaction processing applications by altering the storage device sets 15 and 16 that constitute a primary repository for the data base. It may also process decision support system applications. The remote system 11 normally operates only as the mirror of that data base.

Backup Mode

In accordance with this invention, it is possible for the host system 40 in FIG. 1 to operate independently with the capability of reading information to the storage device sets 42 and 43 and of transferring that information to the backup unit 53. A backup operation begins by using the system manager 50 to block communications through the remote link directors 30 and 33 and communications link 12. Well known processes then update the RLD status registers 25 and 52 in the local system 10 and remote system 11, respectively by shifting the status from the "NORMAL" operating mode to the "BACKUP" mode and altering the operations within the local system 10 and the remote system 11 differently.

Referring again to FIG. 3, any writing operation or updating operation that occurs in the local system 10 during the BACKUP operating mode still alters data in the storage device sets 15 and 16 in step 62 in FIG. 3. However, in step 63 the control 24 determines that the remote system 11 is disconnected because the RLD STATUS block contains the "BACKUP" status. In step 72 the control 24 updates the corresponding TRACK STATUS block 26 to indicate that the remote system 11 no longer contains valid data in the corresponding track because it is not possible to transfer the new data to the remote system 11. In the system of FIG. 1 the corresponding register on the block 26 would be set to "01" for the M1 and M2 sets. The operation of step 72 also occurs if step 73 indicates that a time interval has elapsed without the receipt of an acknowledgement signal, during the normal operating mode.

Thus during the backup mode the host system 13 continues on an uninterrupted basis to process various applications on the data base or other data collection in the storage device sets 15 and 16. This occurs with no significant increase in the time required because the only additional requirement is to set the "M2" bit in the corresponding entry of the TRACK STATUS block 26 to an invalid state (e.g., a "1") in step 72 and because the control 24 performs this function.

Figure 4:
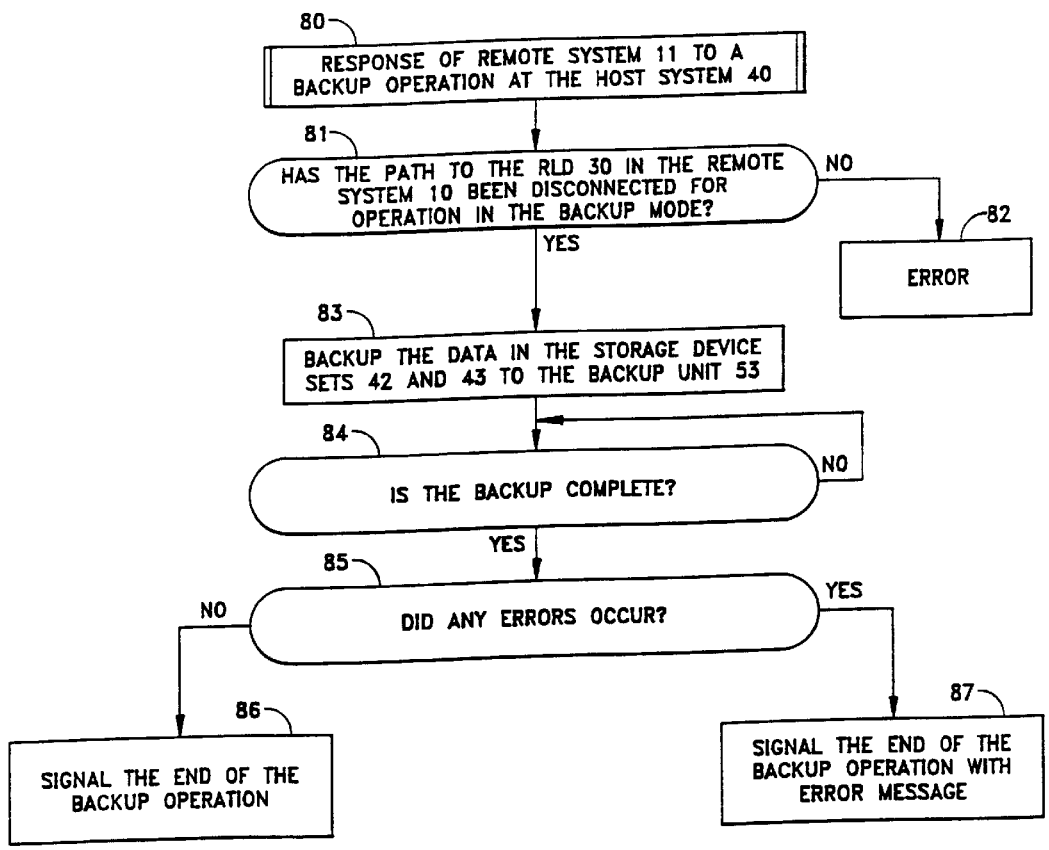
FIG. 4 depicts the process by which a remote system shown in FIG. 1 performs a backup operation.

Once the communications link 12 has been disabled, the remote system 11 responds according to FIG. 4. In step 80 the host 40 is enabled to issue CCW commands that implement a backup operation. Step 81 determines that in fact the system is operating in the BACKUP mode. If not, the control 51 diverts its activities to step 82 to initiate an appropriate error or other procedure. Otherwise in step 83 the control in the system memory 51 begins the backup operation to produce a "point-in-time" backup, the time being the instant the system manager disables transfers. The host processor 40 in FIG. 1 controls the backup unit 53 in this particular embodiment. Generally the host processor will issue a series of commands to read files in succession, although other reading sequences, as track-by-track, could be substituted.

These are conventional read commands that, in a Symmetrix unit, initially attempts to read data in the system memory 41. If not successful, the control in the system memory 41 transfers the requested data from the address locations in the storage device sets 42 and 43 to the system memory 41.

The backup operation continues until step 84 determines that all data has been transferred. That backup may, of course, include all the data or selected portions (e.g., files). Upon completion, step 84 diverts to step 85 to determine whether any errors occurred. If no error occurs, step 86 signals the end of the backup operation so the host system 40 can reenable the path to the local system 10. If an error occurs step 87 produces the signal with an appropriate error identification message. Thus, during this backup mode, the host system 40 transfers all the selected data from the storage device sets 42 and 43 to the backup unit 53.

Figure 5:
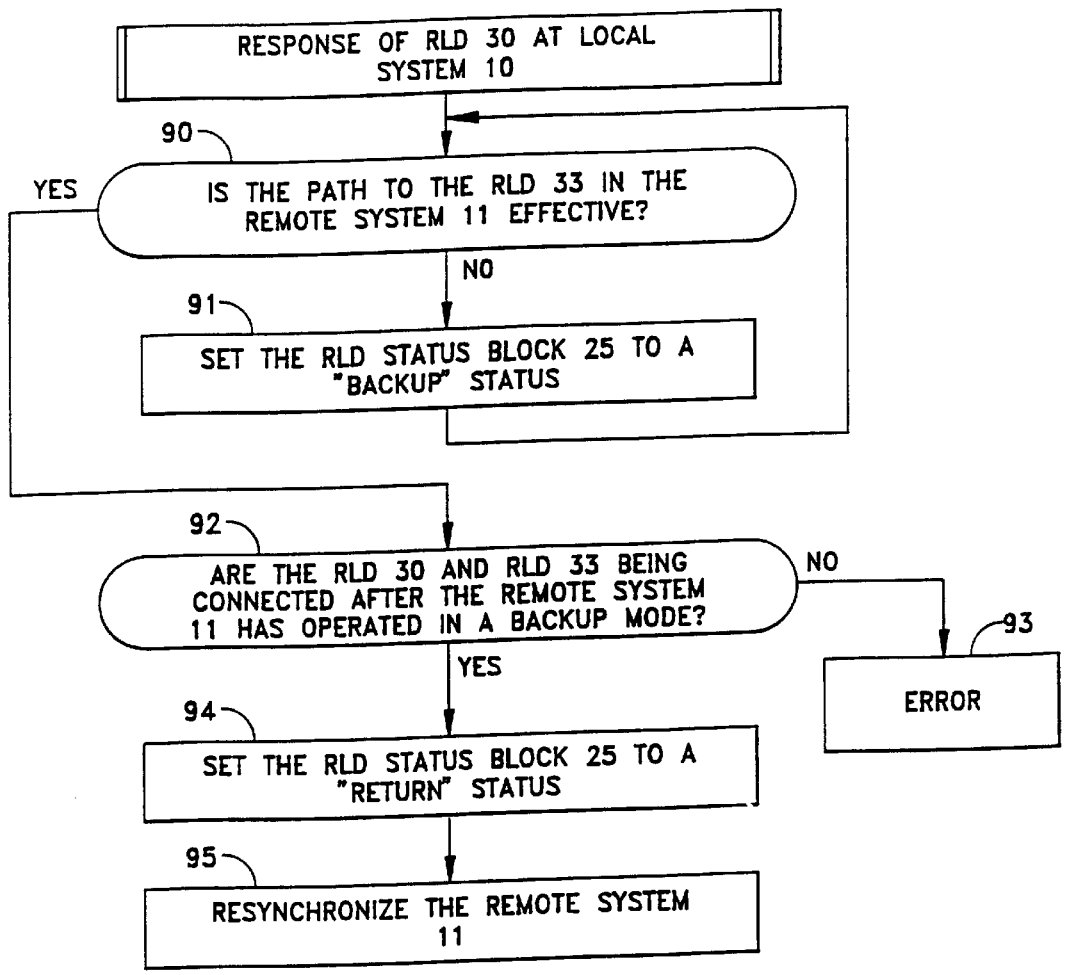
FIG. 5 depicts the operation of a remote link director shown in FIG. 1.

FIG. 5 depicts the pertinent operation of the remote link director 30 at the local system. The control 31 in step 90 determines whether the path through the communications link 12 to the remote link director 33 is effective. If it is not, the control 31 can set the RLD status to the "BACKUP" status in step 91 merely to provide an interval before step 90 tests the status again. Once the path is disabled, the status remains unchanged until a reconnection at the end of the backup mode.

Return to Normal Operating Mode

When the backup concludes, the system manager 50 reestablishes the connection through the communications link 12 and reverts the remote system 11 to the normal operating mode. Simultaneously the control 31 shifts control from step 90 in FIG. 5 to step 92 and determines whether the connection is being made after the remote system has operated in an backup mode based upon information contained in the RLD STATUS block 25 or any alternate location within the remote link director 30. If the two remote link directors 30 and 33 have disconnected for other reasons, then step 92 transfers to step 93 to signal an error condition or take any other appropriate action. Otherwise, the control 31 sets the RLD STATUS block 25 to a "BACKUP RETURN" status in step 94 to indicate a return to the normal operating mode during which resynchronization will occur. Then in step 95 the control 31 resynchronizes the local system 10 and remote system 11. Generally, the control 31 retrieves the TRACK STATUS block 26 and identifies all the tracks in the storage device sets 42 and 43 that have invalid tracks because the host system 13 altered tracks in the data storage sets 15 and 16.

Figure 6:
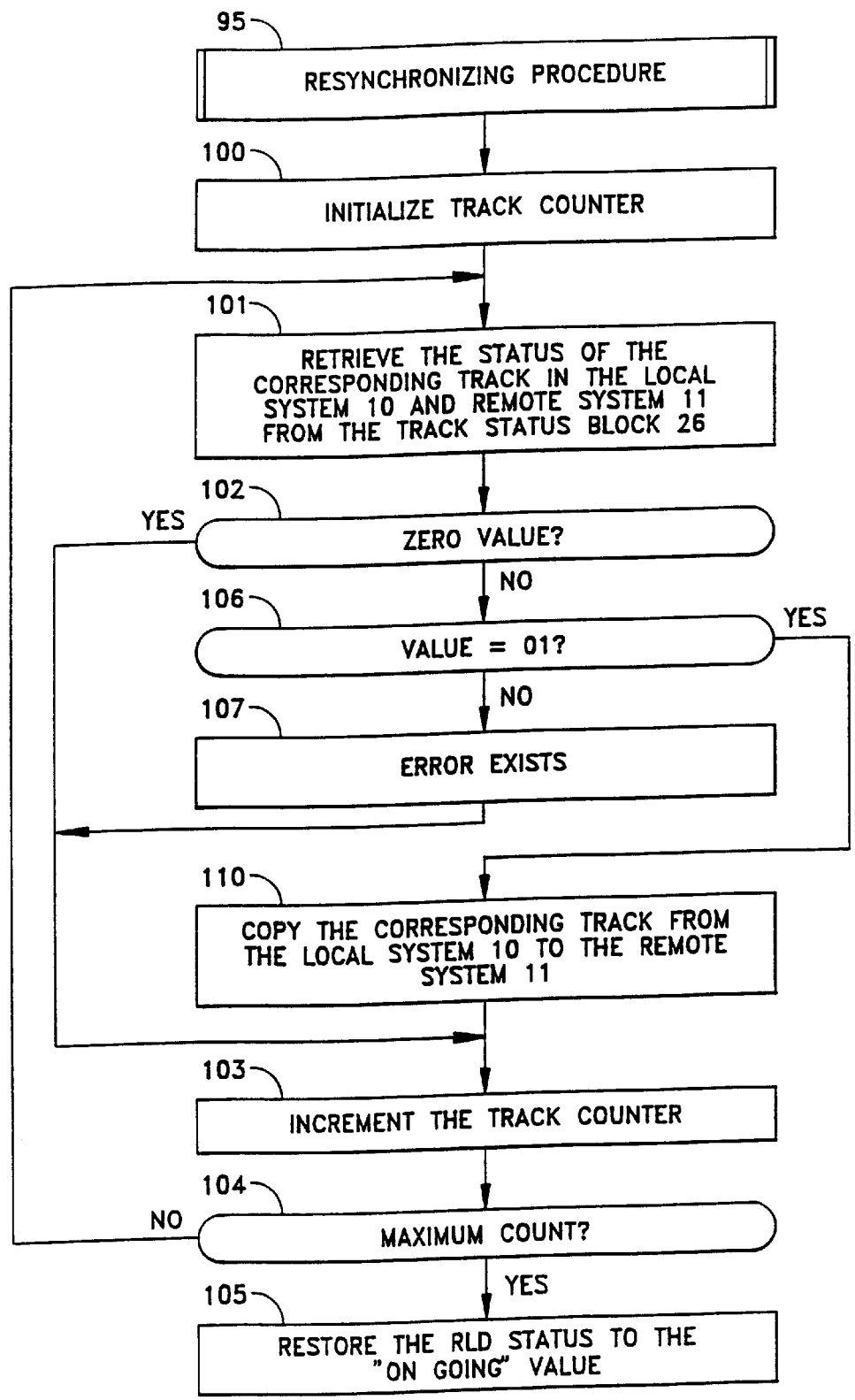
FIG. 6 is a more detailed sequence of the remote link director operation shown in FIG. S.

In one embodiment of this invention, the control 31 performs the resynchronization process of step 95 according to a procedure of FIG. 6. Before discussing this procedure in detail, it will be helpful to understand that at the end of the independent operating mode the collection of bits assigned to a specific track in the TRACK STATUS block 26 and assigned to the local system 10 and mirroring remote system 11 can define only one of two valid bit patterns, namely M1=0 and M2=0 or M1=1 and M2=1 or "00" or "01". That is, if the host system 10 does not alter information in a track during the backup mode, the corresponding M1 and M2 bits in the TRACK STATUS block 26 will be "00". If the host system 40 alters information in a track, the values of the M1 and M2 bits will be "01" indicating that the data on the track in the local system is valid, but that the data in the corresponding track of the remote system 11 is invalid.

FIG. 6 depicts the process by which the control 31 in FIG. 1 uses these bit patterns.to resynchronize the systems. This process is iterative in nature and under the control of a loop controller in the form of a track counter (not shown, but located within the RLD 30) that the process initializes in step 100. In step 101 the control 31 forms a vector corresponding to the data from the TRACK STATUS block 26 for the local system 10 and the remote system 11 that performed the backup.

In step 102, the control 31 determines if the vector has a "ZERO" value, as would occur if no change had occurred in the local system 10. In that event, control passes to a loop control comprising step 103 that increments the track counter to point to a next track in sequence. In step 104 the control determines if all the tracks have been tested by comparing the track counter contents to a maximum value. If more tracks need to be examined, control passes back to step 101. Otherwise the resynchronizing process is complete, and step 104 transfers control to step 105 to restore the status in the RLD STATUS block to the "ONGOING" value indicating a return to normal mirroring operations.

If the vector does not have a "ZERO" value, the control 31 transfers from step 102 to step 106. If the value of the vector is other than "01", then an error exists. The control 31 terminates any further processing with respect to the particular track by noting the error in step 107 through an error condition detection scheme or interrupt handler and then transfers to step 103 in the loop control.

If the vector has a value of "01", the tracks need to be resynchronized. Step 106 then transfers to step 110 to copy the track from the local system 10 to the remote system 11. Next the system transfers operations to step 103 in the loop control.

When step 104 shifts control to step 105, the resynchronizing process of FIG. 6 has tested the bit patterns for each track and copied only those that are needed to resynchronize the data. This operation occurs concurrently with normal operations so that during the process any changes the host system 13 makes to the data also produces a change in the remote system 11. If the host system 13 alters a track during the process, the new data transfers to the remote system 11 conventionally. If the host system 13 alters the track before it is processed by the resynchronizing process the copy program 97 will merely recopy the data from the local system 10 to the remote system 11.

As previously indicated it is possible to modify the network shown in FIG. 1 by adding a third and even a fourth system interconnected through corresponding communications links. The interconnection of three systems could then provide a first system like the local system 10 dedicated to process OLTP or other priority applications, a second remote system like the remote system 11 operating as a mirror and as a mechanism for,performing point-in-time backups, and a third system that always operates to provide a second mirror of the data in the first system. Alternatively, the third system could also be adapted for running other applications.

The general approach of redundancy and remote backups of this invention is particularly effective because the percentage of operations that alter the data on a disk rarely involve the system for a majority of its time. Normally, significantly less then half of all disk operations involve writing operations or data changes. Further the remote system can operate as a backup facility because generally such backups are taken of a snapshot of the data base taken at a particular time. In this particular embodiment that snapshot represents the data base at the instant the system manager 50 disables transfers through the communications link 12.

When implemented as described above, the network shown in FIG. 1 meets the objectives of this invention. The local system 10 and the remote system 11 operate in a mirrored configuration for the vast majority of time to provide redundancy. However, when it is necessary to obtain a backup, that operation occurs at the remote system 11 concurrently with the continued operations within the local system 10 and without any intervention by the local system 10 that could adversely affect its operating characteristics. Immediately upon completion of the backup, the local and remote systems resynchronize to reestablish a mirror relationship. Typically the number of tracks that need to be updated will be minimal, so that the time required to resynchronize the system after running decision support system applications will be minimal. Moreover the copy program, by virtue of its being located in the remote link director 30, performs this resynchronization independently of the processing of applications on the local system 10.

This invention has been disclosed in terms of an embodiment based upon the architecture of the assignees Symmetrix data facilities. Specific implementations are therefore system specific. Discussion of other particular implementations have not been incorporated. Rather the discussion has been directed to how these different systems interact for implementing the remote point-in-time backup To concept of this invention and provide sufficient information for enabling an implementation on the data processing systems of other manufacturers.

In this specific embodiment, data transfers occur on a track-by-track basis with the monitoring of the status of those tracks in the TRACK STATUS block 26 of FIGS. 1 and 2. Other embodiments might operate by transferring data blocks of a longer or shorter length than is carried on a single track. In such an implementation, the TRACK STATUS block 26 would be modified to identify each such block individually. Moreover, the system in FIG. 1 depicts a single host system 13 in the local system 10 and a single host system 40 in the remote system 11. Other systems like the remote system 11 could connect to the local system 10 by separate remote link detectors and communications links. In such a configuration, each remote system could mirror the entirety of the data or portions of the data in the device storage sets 15 and 16. In other embodiments, two or three systems, like the local system 10 could connect to the remote system 11 by means of separate remote link directors and communications links whereby the capacity of the disk storage sets 42 and 43 would be increased to equal all the disk storage capacity to be mirrored collectively in the remaining systems. It will also be apparent other host systems could be added to the configuration in FIG. 1 as by being connected to the channel director 17 or other channel directors, such as channel director 18. It will be apparent that many other modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A method for producing a point-in-time backup of data in a data processing systems having a host computer and a first data storage facility that stores data at predetermined locations in data blocks, a second data storage facility and a data backup facility, the second data storage facility operating, during a normal operating mode, to mirror in the first data storage facility in response to a copy program, said method comprising the steps of:

A) disabling the copy program thereby isolating the second data storage facility from the first data storage facility while enabling the first data processing system to continue its operations with the first data storage facility, B) producing a backup of the data in the data storage facility of the second data storage facility on the backup facility, C) recording, at the first data processing system and during the backup operation, an identification of each data block in the first data storage facility that changes as a result of the operation of the data processing system, and D) upon completion of the backup operation enabling the copy program to copy data blocks from the first data storage facility to the second data storage facility corresponding to the recorded identifications thereby reestablishing the second data storage facility as a mirror of the first data storage facility.

2. A method as recited in claim 1 wherein the data processing system maintains for each data block a data block validity status with a first field indicating the validity of data in a corresponding data block in the first data storage facility and a second field indicating the validity of the data in a corresponding data block in the second data storage facility and wherein said data block identification recording includes the step of responding to each change to a data block in the first data storage facility produced by the data processing system by setting the second field in the corresponding data block validity status to a value that indicates invalid data in the corresponding data block of the second data storage facility.

3. A method as recited in claim 2, wherein each of the data block status fields comprises a bit position having first and second states when the corresponding data is valid and invalid, respectively, said method additionally including the step of converting the status of the second field bit positions at the second state into a list of the data blocks changed by the data processing system during the backup operation, said conversion occurring prior the enablement of the copy program upon completion of the backup operation.

4. A method as recited in claim 1 wherein each data block in the first and second data storage facilities is constituted by a data track and wherein the data processing system maintains for each track a data block validity status with a first field indicating the validity of the data in a track in the first data storage facility and a second field indicating the validity of the data in a corresponding track in the second data storage facility, said data block identification recording including the step of responding to each change in a data block in the first data storage facility produced by the data processing system by setting the second field in the corresponding data block validity status to a value that indicates invalid data in the corresponding track of the second data storage facility.

5. A method for providing a point-in-time backup of data in a first disk storage facility associated with a data processing system, said method comprising the steps of;

A) providing a backup facility and providing a second disk storage facility for operating normally as a mirror for the first disk storage facility;

B) establishing a backup operating mode whereby the second disk storage facility is isolated from the first disk storage facility to enable:

i) the data processing system and the first disk storage facility to continue normal operations and to record each change to the data in the first disk storage facility made during the backup operating mode, and ii) the operation of the backup facility simultaneously with the operation of the data processing system with its first disk storage system to produce a backup of the data in the second disk storage facility; and C) upon completion of the backup operation copying to the second disk storage facility any data in the first disk storage facility that was altered during the backup operation whereby the second disk storage facility resumes its operation as a mirror for the first disk storage facility.

6. A method as recited in claim 5 wherein data transfers are made in data blocks and wherein during the backup operating mode said recording identifies each data block that is changed in the first disk storage facility during the backup operating mode, said copying transferring data in the identified data blocks of the first disk storage facility to the second disk storage facility.

7. A method as recited in claim 6 wherein said recording of changes comprises the step of defining, for each data block, first and second data validity indicators corresponding to the data blocks in the first and second disk storage facilities, respectively, and for each change made to a data block in the first disk storage facility the method includes establishing a value for the corresponding second data validity indicator indicating that the data in the corresponding data block in the second disk storage facility is invalid.

8. A method as recited in claim 6 wherein each data block in the first and second disk storage facilities is constituted by a track and said recording of changes comprises the step of defining, for each track, first and second bit positions corresponding to corresponding tracks in the first and second disk storage facilities, respectively, and for each change made to a track in the first disk storage facility the method includes establishing a value for the corresponding second bit position indicating that the data in the corresponding track in the second disk storage facility is invalid.

9. A method for providing data redundancy from a first data storage facility in a data processing system, said method comprising the steps of:

A) providing a backup facility using a backup medium and a second data storage facility that operates in a first mode for producing on the second data storage facility a redundant copy of the data stored in the first storage facility;

B) establishing a second operating mode by:

i) isolating the second data storage facility from the first data storage facility, ii) continuing normal operations between the first data storage facility and the data processing system and recording changes to the data in the first data storage facility made during the second operating mode, and iii) transferring data from the isolated second data storage facility to the medium in the backup facility simultaneously with and independently of the operation of the data processing system with the first data storage facility; and C) reestablishing, after completion of the data transfer and independently of the data processing system, the first operating mode whereby the data in the second data storage facility is updated by transferring data for which changes have been recorded during the second operating mode from the first data storage facility.

10. A method as recited in claim 9 wherein data is stored in data blocks in the first and second data storage facilities and wherein during the backup operating mode said change recording identifies each data block that is changed in the first data storage facility whereby, upon completion of the backup and the return to the normal operating mode, data in changed blocks transfers from the first to second data storage facility thereby to reestablish the redundancy of the data in the second data storage facility.

11. A method as recited in claim 10 wherein said recording of changes comprises the step of defining, for each data block, first and second data validity indicators corresponding to the data blocks in the first and second data storage facilities, respectively, and for each change made to a data block in the first data storage facility the method includes establishing a value for the corresponding second data validity indicator indicating that the data in the corresponding data block in the second data storage facility is invalid.

12. A method as recited in claim 10 wherein each data block in the first and second data storage facilities is constituted by a track and said recording of changes comprises the step of defining, for each track, first and second bit positions corresponding to the tracks in the first and second data storage facilities, respectively, and for each change made to a track in the first data storage facility the method includes establishing a value for the corresponding second bit position indicating that the data in the corresponding track in the second data storage facility is invalid.

13. A method for backing up data from a first data storage facility in a first data processing system, said method comprising the steps of:
   A) providing a backup system including a second data storage facility and a backup facility using a backup medium for receiving data from the second data storage facility and a program for effecting a backup operation;
   B) establishing a path between the first and second data storage facilities to enable the second data storage facility to mirror the first data storage facility,
   C) responding to a backup command to the backup system by:
      i) interrupting communications over the path between the first and second data storage facilities without disrupting normal operations between the first data storage facility and the data processing system,
      ii) enabling the backup program to transfer data from the isolated second data storage facility to the medium in the backup facility simultaneously with and independently of the operation of the data processing system; and
   D) reestablishing, after completion of the backup operation and independently of the data processing system, the path between the first and second data storage facilities whereby the second data storage facility is reestablished as a mirror for the first data storage facility.

14. A method as recited in claim 13 wherein each of the first and second data storage facilities stores data in data blocks and wherein during the backup operation each change to a data block in the first data storage facility is recorded whereby, upon completion of the backup data in the blocks changed during the backup operation are copied to corresponding data blocks in the second data storage facility.

15. A method as recited in claim 14 wherein said recording of changes comprises the step of defining, for each data block, first and second data validity indicators corresponding to the data blocks in the first and second data storage facilities, respectively, and for each change made to a data block in the first data storage facility the method includes establishing a value for the corresponding second data validity indicator indicating that the data in the corresponding data block in the second data storage facility is invalid.

16. A method as recited in claim 14 wherein each data block in the first and second data storage facilities is constituted by a track and said recording of changes comprises the step of defining, for each track, first and second bit positions corresponding to the tracks in the first and second data storage facilities, respectively, and for each change made to a track in the first data storage facility the method includes establishing a value for the corresponding second bit position indicating that the data in the corresponding track in the second data storage facility is invalid.

17. A point-in-time backup system for producing a point-in-time backup of data in a data processing systems having a host computer, a first data storage facility that stores data at predetermined locations in data blocks and a second data storage facility, said system comprising:
   A) a data backup facility,
   B) a backup mode controller for establishing normal and backup operating modes, said second data storage facility operating, during a normal operating mode to mirror in the first data storage facility in response to a copy program,
   C) a mode controller that disables the copy program and isolates the second data storage facility from the first data storage facility during a backup operating mode, the first data processing system continuing its operations with the first data storage facility, during the backup operating mode,
   D) a backup program for transferring data from the second data storage facility to the backup facility,
   E) a memory that, during the backup operation, records an identification of each data block in the first data storage facility that changes as a result of the operation of the data processing system during the backup operation, said controller, upon completion of the backup operation enabling the copy program to copy data blocks corresponding to the recorded identifications from the first data storage facility to the second data storage facility thereby reestablishing the second data storage facility as a mirror of the first data storage facility.

18. A point-in-time backup system as recited in claim 17 wherein the data processing system maintains, for each data block, a data block validity status with a first field indicating the validity of the data block in the first data storage facility and a second field indicating the validity of the data block in the second data storage facility and wherein said data block identification recorder responds to each change in a data block produced by the data processing system in the first data storage facility by setting the second field in the corresponding data block validity status to a value that indicates the data in the corresponding block of the second data storage facility is invalid.

19. A point-in-time backup system as recited in claim 18 wherein each of the data block status fields comprises a bit position having first and second states when the corresponding data is valid and invalid, respectively, said recorder including a status converter that, at the end of a backup operation, transforms the second field bit position at the second state into a list of data blocks that had been changed by the data processing system during the backup operation.

20. A point-in-time backup system as recited in claim 17 wherein each data block in the first and second data storage facilities is constituted by a data track and wherein said data block identification recorder maintains for each track validity status with a first field indicating the validity of the data in the track in the first data storage facility and a second field indicating the validity of the data in a corresponding track in the second data storage facility, said recorder responding to each change in a data block produced by the data processing system in the first data storage facility by setting the second field in the corresponding data block validity status to a value that indicates invalid data in the corresponding track of the second data storage facility.

21. A backup system for providing data mirroring and point-in-time backup of data in a first disk storage facility associated with a data processing system, said system comprising:

A) a backup facility;

B) a second disk storage facility for operating normally as a mirror for the first disk storage facility;

C) a mode controller that establishes a backup operating mode and isolates the second disk storage facility from the first disk storage facility to enable the data processing system and the first disk storage facility to continue normal operations and to record changes to the data in the first disk storage facility during the backup operating mode and to enable the operation of the backup facility simultaneously with the operation of the data processing system with its first disk storage system to produce a backup of the data in the second disk storage facility; and D) a copy program enabled upon the reestablishment of the normal operating mode after a backup operation to transfer any data in the first disk storage facility that was altered during the backup operation to the second disk storage facility whereby the second disk storage facility is enabled to resume its operation as a mirror for the first disk storage facility.

22. A backup system as recited in claim 21 wherein data is transferred in data blocks, said system comprising a recorder in said mode controller that identifies each data block that is changed in the first disk storage facility whereby upon completion of the backup and the return to the normal operating mode data in the identified changed blocks transfers from the first to second disk storage facility thereby to reestablish the second disk storage facility as a mirror of the first disk storage facility.

23. A backup system as recited in claim 22 wherein said recorder includes first and second data validity indicators corresponding to each data block in the first and second disk storage facilities, respectively, and means responsive to each change to a data block in the first disk storage facility by establishing a value in the corresponding second data validity indicator indicating that the data in the corresponding data block in the second disk storage facility is invalid.

24. A backup system as recited in claim 22 wherein each data block in the first and second disk storage facilities is constituted by a track and said recorder includes first and second bit positions corresponding to each track in the first and second disk storage facilities, respectively, and means responsive to each change made to a track in the first disk storage facility by establishing a value for the corresponding second bit position indicating that the data in the corresponding track in the second disk storage facility is invalid.

25. A system for backing up data from a first data storage facility in a data processing system, said system comprising:

A) a backup facility using a backup medium and a second data storage facility that operates in a first mode for producing on the second data storage facility a redundant copy of the data stored in the first storage facility;

B) a mode controller for establishing a second operating mode including:

i) means for isolating the second data storage facility from the first data storage facility whereby normal operations between the first data storage facility and the data processing system continue, ii) means for recording changes to the data in the first data disk storage facility during the second operating mode, iii) means for transferring data from the isolated second data storage facility to the medium in the backup facility simultaneously with and independently of the operation of the data processing system with the first data storage facility; and iv) means for reestablishing, after completion of the data transfer and independently of the data processing system, the first operating mode whereby the second data storage facility is updated by transferring data for which changes were recorded in the second operating mode from the first data storage facility.

26. A backup system as recited in claim 25 wherein data is stored in data blocks in the first and second data storage facilities and wherein said recording means identifies each data block that is changed in the first data storage facility whereby, upon completion of the backup and the return to the normal operating mode, data in changed blocks transfers from the first to second data storage facility thereby to reestablish the redundancy of the data in the second data storage facility.

27. A backup system as recited in claim 26 wherein said recorder includes, for each data block, first and second data validity indicators corresponding to the data blocks in the first and second data storage facilities, respectively, and value control means responsive to each change to a data block in the first data storage facility by establishing a value for the corresponding second data validity indicator indicating that the data in the corresponding data block in the second data storage facility is invalid.

28. A backup system as recited in claim 26 wherein each data block in the first and second data storage facilities is constituted by a track and said recorder comprises, for each track, first and second bit positions corresponding to the tracks in the first and second data storage facilities, respectively.

29. A data redundancy system for providing data mirroring and point-in-time backup for data in a first data storage facility in a data processing system, said system comprising:

A) a second data storage facility,

B) a backup facility using a backup medium for receiving data from the second data storage facility and a program for effecting a backup operation;

C) means for establishing a path between the first and said second data storage facilities to enable said second data storage facility to mirror the first data storage facility, D a backup mode controller responsive to a backup command to the backup system including:

i) means interrupting communications over said path without disrupting normal operations between the first data storage facility and the data processing system, ii) means for enabling the backup program to transfer data from said isolated second data storage facility to said backup medium, simultaneously with and independently of the operation of the data processing system; and iii) means for reestablishing, after completion of the backup operation and independently of the data processing system, the path between the first and said second data storage facilities whereby the second data storage facility is reestablished as a mirror for the first data storage facility.

30. A data redundancy system as recited in claim 29 wherein said second data storage facility stores data in data blocks and wherein during the backup operation each change to a corresponding data block in the first data storage facility is recorded whereby, upon completion of the backup, data in the blocks changed during the backup operation are copied to corresponding data blocks in said second data storage facility.

31. A data redundancy system as recited in claim 30 wherein said recorder comprises, for each data block, first and second data validity indicators corresponding to the data blocks in the first and said second data storage facilities, respectively, and means responsive to each change to a data block in the first data storage facility for establishing a value for the corresponding second data validity indicator indicating that the data in the corresponding data block in the second data storage facility is invalid.

32. A data redundancy system as recited in claim 30 wherein each data block in the first and second data storage facilities is constituted by a track and said recorder comprises, for each track, first and second bit positions corresponding to the tracks in the first and said second data storage facilities, respectively, and means responsive to each change to a track in the first data storage facility for establishing a value for said corresponding second bit position indicating that the data in the corresponding track in said second data storage facility is invalid.

* * * * *